Figure 2:
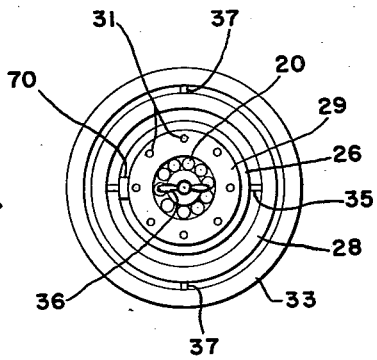

June 25, 1957     H. H. BAUGH ET AL     2,796,759

BALL BEARING TEST MACHINE

Filed July 10, 1953

INVENTOR
HERBERT H. BAUGH
KURT G. F. MOELLER

BY *George Sipkin*
*B. L. Zangwill*

ATTORNEYS

United States Patent Office 2,796,759
Patented June 25, 1957

2,796,759

BALL BEARING TEST MACHINE

Herbert H. Baugh, Riva, and Kurt G. F. Moeller, Annapolis, Md.

Application July 10, 1953, Serial No. 367,374

9 Claims. (Cl. 73—67)

(Granted under Title 35, U. S. Code (1952), sec. 266)

The invention described herein may be manufactured and used by or for the Government of the United States of America for governmental purposes without the payment of any royalties thereon or therefor.

The present invention relates to a ball bearing test machine and more particularly to a machine for measuring the vibration frequency and intensity of a bearing or bearings which is independent of extraneous factors, particularly vibration and noise from other bearings.

The previous devices employed for performing the functions of this invention involve the utilization of one or two auxiliary bearings holding one end of a test shaft. The assembly used in the known methods invariably resulted in an introduction of errors, i. e., load, vibration and noise errors in which the effect of the auxiliary bearings was not distinguishable from that of the bearing under test.

It has been generally accepted that ball bearings are inherently "noisy." Recent studies have indicated that this is not necessarily true. What has been considered ball bearing noise is actually noise emanating from surrounding structural members which have been excited into their own natural frequencies by the irregularities present in the ball bearings. Thus, the ball bearing is, in effect, an exciter. It is readily apparent that a ball bearing in a motor generator set will produce an entirely different noise spectrum than the same ball bearing installed in, for example, a compressor unit. In the case of the motor generator, design of the end bells, bearing supports, and the like are of considerable importance with regard to the noise attributed to ball bearings.

The excitations due to the irregularities or imperfections of present production type bearings are small in magnitude. The level of the "white" noise, that is, noise with no definite pitch, is so low that discrimination from the ambient noise is very difficult. In addition, the supporting or auxiliary bearings now employed in most test machines will make measuring of the noise level emitted by the ball bearings increasingly difficult as improvements in the accuracy and precision of ball bearing manufactures are made.

An object of the present invention is the provision of a new test machine for accurately measuring the vibration intensity output of ball bearings.

Another object is to provide a balanced suspension system used in conjunction with the bearing under test.

A further object of the invention is the provision of a gyroscopic stabilizer employing a single bearing under test which is loaded axially to any desired degree for measuring the degree of efficiency of the bearing.

Another object of the invention is the provision of a pick-up device in communication with the bearing which is connected with a series of resonators and electromagnetic pick-up coils for measuring the vibration and noise output of the bearing under test.

Figure 1:
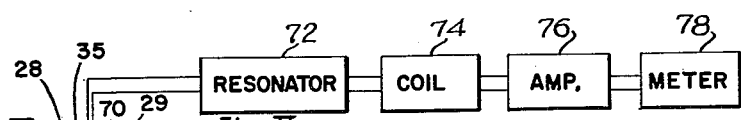
Figure 1:
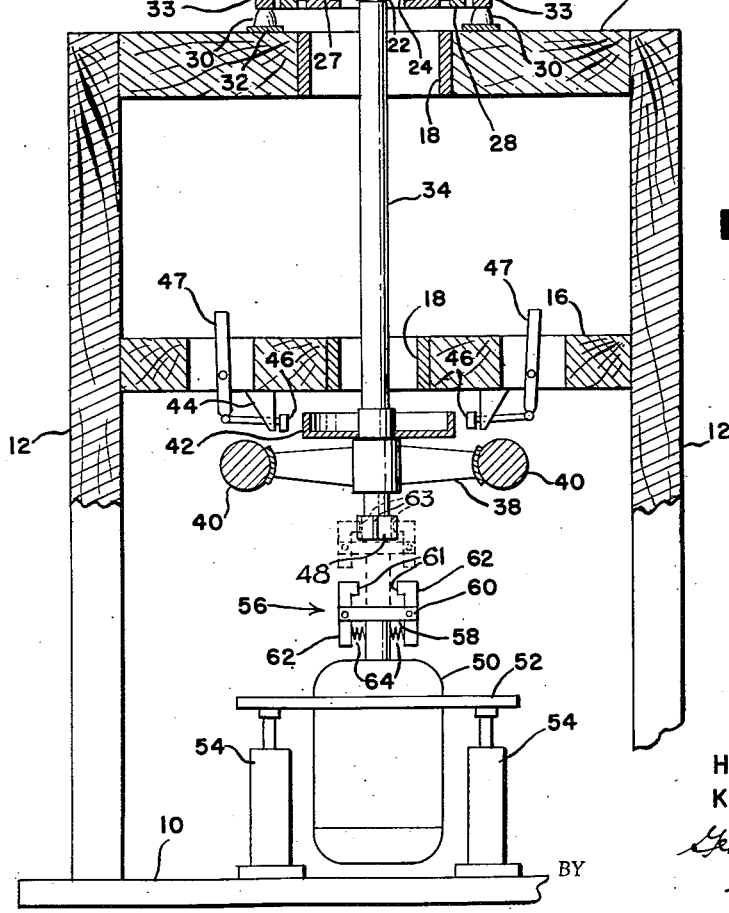

With these and other objects in view, as will hereinafter more fully appear, and which will be more particularly pointed out in the appended claims, reference is now made to the following description taken in conjunction with the accompanying drawings in which:

Figure 1 is a view in elevation, partly in section, showing details of the ball bearing test machine; and Figure 2 is a plan view of the apparatus shown partly in section in Figure 1.

Referring now to the drawings, wherein like reference characters designate like or corresponding parts throughout the several views, there is shown a test stand or supporting structure for containing the machine of this invention. The stand comprises a base 10 having upright vertical members 12 and a top 14. Intermediate the top and bottom portions is a platform 16 secured to each of the side members 12. The top and intermediate portions 14 and 16 are provided with central openings 18 for receiving a shaft which is part of the machine.

The ball bearing under test comprises balls 20 and inner and outer races 22 and 24, the latter being mounted within a ring 26, which is part of a Cardan suspension.

The ring 26 is provided with a flanged portion thereby forming a bearing seat 27 for the outer race of the ball bearing. A clamping ring 29 is positioned over outer race 24 and is rigidly secured to ring 26 by means of bolts 31 which are preferably tightened by a torque wrench. It will be noted that the shoulder formed by seat 27 is slightly smaller than the depth of outer race 24, this being for the purpose of assuring an equal application of force by clamping ring 29 on the outer race while the bearing is undergoing test.

The Cardan suspension referred to above comprises a gimbal system for maintaining the apparatus on a horizontal plane. A pair of concentric gimbal rings 28 and 33 are positioned exterior to ring 26; gimbal ring 28 being connected to the latter by means of a pair of oppositely disposed pins 35, while gimbal ring 33 supports the apparatus by virtue of pins 37 connecting the ring 33 with ring 28. The above described gimbal system is old and is generally utilized to maintain compasses installed on ships, on an even keel.

It is important that the above described structure be completely isolated from the test stand in order to secure the elimination of outside noises which might adversely affect the test being conducted. In furtherance of this, a plurality of rubber noise mounts 30 are positioned between ring 33 and supporting members 32 positioned immediately therebelow. The rubber mounts are selected so that the natural frequency of the mounted system becomes low, preferably below 5 C. P. S.

In order to run the ball bearing, a hollow damped shaft 34 is positioned within the opening 18 and terminates at its upper end in the inner race 22. A wing nut 36, or other appropriate securing means, effectively holds the shaft 34 to the inner race. The other end of shaft 34 passes through a wheel 38 positioned below intermediate member 16 and is provided with suitable loading and balancing weights 40 which are positioned on the outer periphery thereof. A brake drum 42 is located above the fly wheel 38 and is attached to shaft 34 by means of a key and slot arrangement, or other appropriate securing means, in order to rigidly affix the brake drum to the shaft. Braking means are provided for coaction with drum 42 in order to bring shaft 34 to a stopped position, and this is generally shown as comprising a pair of supporting members 44 subtended from platform 16. The lower sections of members 44 are provided with appropriate openings for receiving brake shoes 46, and operating levers 47 associated therewith. The brake shoes 46 are adapted for engagement with drum 42 for stopping rotation of the shaft. The shaft 34 extends a short distance downwardly from fly wheel 38 and terminates in a coupling 48 rigidly affixed to the end thereof.

A motor 50, employed for rotating the shaft 34, is centrally aligned and suspended in a motor supporting plate 52. This plate extends outwardly from the motor and is adapted for engagement by a pair of elevating devices 54 which contact the underside of the plate for raising and lowering the motor. These elevating devices may comprise, for example, a pair of hydraulic or mechanically operated jacks which serve to move a clutch 56 into and out of operative engagement with coupling 48 secured to the bottom end of shaft 34.

The particular type of clutch employed is not of particular importance, but it preferably should have the characteristic of being capable of quickly and smoothly breaking contact with coupling 48 when disengagement with shaft 34 is necessary. The type of centrifugal clutch shown herein contains this characteristic and comprises a pair of horizontal bars 58 affixed on opposite sides of the motor armature shaft. Pivotally mounted at 60 in the ends of the bars, is a pair of claw type arms 62 having fingers 61 adapted for engagement with mating openings or slots 63 formed in the sides of coupling 48. Springs 64 are mounted between the armature shaft and the lower ends of arms 62 and are provided with spring tensioning means, not shown, for normally biasing the lower ends of arms 62 apart and into a clutch engaging position i. e., with fingers 61 in slots 63.

In order to detect a frequency of the vibration or noise from the bearing, a vibration pick-up 70 is affixed to either the upper or lower side of ring 26 in the Cardan suspension. The frequencies to be measured will vary according to the function or the use to which the bearings are to be put and by the geometry of each of the bearings under test. The vibration level is low, therefore a series of resonators are connected with the vibration pick-up 70 for magnifying the amplitude of the significant vibration frequencies produced by the bearings and detected by the pick-up. The resonator 72 is equipped with an electromagnetic coil 74 which receives the vibration frequencies and feeds the signal into an amplifier 76 for amplification prior to the delivering of the signals to a recorder or indicating meter 78.

It is to be noted that the application of resonators at the input side of the amplifier improves the signal to noise ratio, which actually determines the sensitivity of the system, not the amplification factor. The vibration pick-up 70 was selected in a particular application to have a frequency range less than 200 C. P. S., although it is to be understood that besides this pickup system, one or more additional pick-ups can be installed to cover the frequency range above 200 C. P. S. Further, this principle of detecting various noise outputs is not confined to ball bearing tests but is applicable to any type of noise or vibration tests where discrete frequencies of low amplitude are involved.

The driving arrangement with the motor below the test shaft is only one modification of many showing how the ball bearing is free for manipulation. For example, the motor could be located above the ball bearing and in close association therewith thereby deriving the advantage of locating the coupling very close to the bearing, and irregularities in disengaging the clutch will have less effect on the steady run of the gyro-pendulum.

In operation, the motor 50 is raised by means of elevating devices 54 until clutch member 56 contacts coupling 48 and, at this time, is detachably connected therewith. The motor is started, thereby causing flywheel 38 and shaft 34 to revolve at a predetermined speed. This causes the bearing 20 under test to run and when the flywheel is up to a predetermined speed, the arms 62 of clutch 56 due to centrifugal force, overcome the spring tension and fingers 61 fly outwardly out of engagement with slots 63 thereby disengaging the clutch from the coupling 48. The motor is then lowered and stopped. Thereafter the flywheel revolves with a slowly decreasing speed because of its inertia, the decay in speed being solely a function of the friction in the bearing under test. At any desired speeds during the free run, which over a predetermined time may be considered substantially constant because of the flywheel inertia, measurements of bearing noises or vibrations indicative of irregularities therein may be made exclusive of any external noises.

The shaft and flywheel are in effect a gyro-pendulum which is suspended and supported exclusively by the test bearing. Accordingly, any of the noises emitted by this system will be those which are forthcoming from the bearing under test. These noises are detected by the vibration pick-up and fed to the resonators which have been selected for the proper frequencies, and are caused to resonate thereby magnifying the amplitude of the significant vibration frequencies. The signal is fed through the above described system and observed or recorded on indicating instruments incorporated therein.

The number and natural frequencies of the resonators required for the apparatus can be determined by taking into consideration the various parameters of a ball bearing. An analysis is indicated below, using the following symbols:

$r_I$ = radius of inner race [mm.]
$r_O$ = radius of outer race [mm.]
$r_B$ = radius of balls [mm.]
$r_T$ = radius of ball train [mm.]
$m$ = number of balls [scalar]
$n_R$ = speed of inner race or shaft [R. P. M.]
$n_T$ = speed of ball train [R. P. M.]
$n_B$ = spin (rotational speed) of the balls [R. P. M.]
$f_R$ = frequency due to shaft-rotation [C. P. S.]
$f_T$ = frequency due to rotation of ball train [C. P. S.]
$f_B$ = frequency due to spin of balls [C. P. S.]
$f_I$ = frequency stemming from inner race [C. P. S.]
$f_O$ = frequency stemming from outer race [C. P. S.]

According to the geometry of ball bearings:

$$r_T = r_I + \tfrac{1}{2} r_B$$

Further, there are these relations:

$$n_T = n_R \frac{r_I}{r_I + r_O}$$

$$n_B = \frac{n_R \times r_O}{r_B} \times \frac{r_I}{r_I \times r_O}$$

There are five determinable frequencies related as follows:

$$f_R = n_R \times \tfrac{1}{60} \text{ [C. P. S.]}$$
$$f_T = n_T \times \tfrac{1}{60} \text{ [C. P. S.]}$$
$$f_B = n_B \times \tfrac{1}{60} \text{ [C. P. S.]}$$
$$f_I = (n_R - n_T) \tfrac{1}{60} \times m \text{ [C. P. S.]}$$
$$f_O = n_T \times \tfrac{1}{60} \times m \text{ [C. P. S.]}$$

To illustrate, arbitrary values are assigned the indicated parameters as follows:

$r_I$ = 11 mm.  $\qquad n_R$ = 1800 R. P. M.
$r_O$ = 19 mm.  $\qquad m$ = 10
$r_B$ = 4 mm.

From these values it can be seen that:

$$f_R = 1800 \times \tfrac{1}{60} = 30 \text{ C. P. S.}$$
$$f_T = 1800 \times \tfrac{11}{30} \times \tfrac{1}{60} = 11 \text{ C. P. S.}$$
$$f_B = 1800 \times \tfrac{19}{4} \times \tfrac{11}{30} \times \tfrac{1}{60} = 52 \text{ C. P. S.}$$
$$f_I = 19 \times 10 = 190 \text{ C. P. S.}$$
$$f_O = 11 \times 10 = 110 \text{ C. P. S.}$$

$f_R$ is an excitation caused by any even minor amount of unbalance $f_T$ is an excitation caused by the ball train rotation due to irregularities of the train, i. e., retainer, etc. or a ball $f_B$ is an excitation caused by the rotation of the balls assuming that most of the balls are rolling in contact with the races $f_I$ is an excitation caused by one irregularity in the inner race $f_O$ is an excitation connected with any irregularity in the outer race The above factors for the selected example indicate that the more important frequencies are 11, 30, 52, 110 and 190 C. P. S. Harmonics of these frequencies which may be caused by multiple nearly equidistant irregularities may also be of importance.

Obviously many modifications and variations of the present invention are possible in the light of the above teachings. It is therefore to be understood, that within the scope of the appended claims, the invention may be practiced otherwise than as specifically described.

What is claimed is:

1. A test machine for measuring a vibration frequency of the noise generated by a bearing having an inner race, an outer race and members rollable therebetween, a vertical shaft having a race of a bearing to be tested secured thereto, stationary support means comprising a support having a horizontal seat for the other of said races, means for manually releasably securing said other race in said seat, means for rotating said shaft to a predetermined speed, means for disengaging said rotating means from said shaft upon reaching said predetermined speed, a balanced flywheel on said shaft at a point below said seat adapted to load said bearing and to maintain its rotation for a time decrement after disengagement of said shaft from said rotating means, said bearing being the sole support of said shaft, and noise pick-up means for detecting noise generated in said bearing during its free run.

2. A test machine for measuring a vibration frequency of the noise generated by a bearing having an inner race, an outer race and members rollable therebetween, a vertical shaft having a race of a bearing to be tested secured thereto, stationary support means comprising a support having a horizontal seat for the other of said races, means for manually releasably securing said other race in said seat, said bearing being the sole support for said shaft, rotating means, a centrifugal clutch comprising a pair of engageable and disengageable members, one of said clutch members being attached to an end of said shaft and the other clutch member to said rotating means, said members adapted to disengage said rotating means and said shaft when a predetermined speed is attained, means on said shaft for maintaining rotation after disengagement, and means for measuring noises emanating from said bearing during its free run.

3. A ball bearing test machine for measuring vibration frequencies emanating from a bearing under test comprising, support means for said bearing, a weighted shaft adapted to be suspended solely from said bearing, a driving unit detachably connected to said shaft for imparting rotary movement thereto, means for detaching said unit at a predetermined speed, and means responsive to noises from said bearing for sensing said vibration frequencies after detachment of said driving unit from said shaft whereby measurements may be made during the free run of said bearing.

4. A ball bearing test machine for measuring vibration frequencies of a bearing having an inner race, an outer race and roller bearings therebetween, a Cardan suspension for supporting the outer race of said bearing in a horizontal plane, a weighted vertical shaft adapted to rotate said inner race, said shaft adapted to be supported solely by said bearing, means for driving said shaft to a predetermined speed, means disconnecting said driving means and said shaft after said speed has been reached, and means sensing vibration frequencies emanating from said bearing during its free run.

5. A machine as recited in claim 2 wherein said means for maintaining rotation is a balanced flywheel.

6. An apparatus for testing ball bearings having an outer race, inner race, and ball bearings therebetween, comprising support means, a Cardan ring suspension resiliently mounted on said support means, said Cardan ring adapted to hold the outer race of the bearing under test stationary, a vertical shaft adapted to be supported by and secured at one end to the inner race of said bearing, driving means adapted to rotate said shaft from its other end, a fllywheel mounted on said shaft adjacent said other end, means for decoupling said driving means from said shaft upon the attainment of a predetermined speed, said flywheel maintaining the shaft rotating at substantially constant speed for a predetermined time after the driving means has been decoupled from the shaft, and means for detecting noise components arising in said bearing during its free run.

7. An apparatus for measuring imperfections and irregularities in ball bearings through detection of vibration frequencies set up in said bearings, which comprises means for supporting a race of a ball bearing with its axis of rotation vertical, a vertical shaft detachably secured to the other race of the bearing, a rotary drive means, clutch means comprising a clutching member secured to said shaft and comprising a cooperating clutching member connected to be driven by said rotary drive means, and means for clutching and declutching said clutching members, and means for detecting vibration in said bearing while said shaft is rotating but declutched from said rotary driving means, said shaft when declutched being supported solely by said supporting means through said bearing.

8. A test machine for measuring a vibration frequency of the noise generated by a bearing having an inner race, an outer race and members rollable therebetween, support means for supporting said bearing by a first of its races with the axis of the bearing vertical, said support means comprising manually-releasable holding means for holding said first race stationary, means for rotating the other of the races of said bearing, the last said means comprising a shaft, means for detachably connecting said shaft vertically to the other of said races, a drive, a releasable clutch for clutching said drive to said shaft to rotate said shaft, and means for releasing said clutch during rotation of said other race by said shaft, and noise pick-up means responsive to noises in said bearing and operable while said clutch-releasing means holds said clutch released for detecting noises from said bearing.

9. Apparatus for detecting noise generated within a bearing to the exclusion of external noise effects, said bearing having an outer race and an inner race, said apparatus comprising means for firmly mounting a first of said races on a support, means for applying a rotative force to the second of said races for rotating the second of said races, the last said means including means for removing said force after a predetermined speed has been reached, means for supporting the rotating race solely by said first race, and means electrically detecting noise in said bearing during said rotation of said second race while supported as aforesaid.

References Cited in the file of this patent

UNITED STATES PATENTS

| | | |
|---|---|---|
| 216,228 | Seymour | June 3, 1879 |
| 728,315 | Snell | May 19, 1903 |
| 1,878,129 | Griswold | Sept. 20, 1932 |
| 2,468,648 | Abbott et al. | Apr. 26, 1949 |